(12) United States Patent
Singer

(10) Patent No.: US 11,182,853 B2
(45) Date of Patent: Nov. 23, 2021

(54) USER ACTION FOR CONTINUED PARTICIPATION IN MARKETS

(71) Applicant: TRADING TECHNOLOGIES INTERNATIONAL, INC., Chicago, IL (US)

(72) Inventor: Scott F. Singer, Green Oaks, IL (US)

(73) Assignee: Trading Technologies International, Inc., Chicago, IL (US)

( * ) Notice: Subject to any disclaimer, the term of this patent is extended or adjusted under 35 U.S.C. 154(b) by 463 days.

(21) Appl. No.: 15/194,363

(22) Filed: Jun. 27, 2016

(65) Prior Publication Data

US 2017/0372419 A1 Dec. 28, 2017

(51) Int. Cl.
*G06Q 40/04* (2012.01)

(52) U.S. Cl.
CPC .................. *G06Q 40/04* (2013.01)

(58) Field of Classification Search
CPC .................................................. G06Q 40/04
USPC .......................................................... 705/37
See application file for complete search history.

(56) References Cited

U.S. PATENT DOCUMENTS

| | | | |
|---|---|---|---|
| 5,612,719 A | 3/1997 | Beernink et al. | |
| 6,154,723 A | 11/2000 | Cox et al. | |
| 6,311,214 B1 | 10/2001 | Rhoads | |
| 6,317,132 B1 | 11/2001 | Perlin | |
| 6,772,132 B1 | 8/2004 | Kemp, II et al. | |
| 6,825,861 B2 | 11/2004 | Wasko et al. | |
| 6,856,259 B1 | 2/2005 | Sharp | |
| 7,127,424 B2 * | 10/2006 | Kemp, II | G06Q 30/0275 705/37 |
| 7,389,258 B2 * | 6/2008 | Brumfield | G06Q 40/00 705/35 |
| 7,523,064 B2 * | 4/2009 | Burns | G06Q 40/04 705/37 |

(Continued)

FOREIGN PATENT DOCUMENTS

| | | | |
|---|---|---|---|
| AU | 2007201965 A1 * | 5/2007 | ............. G06Q 40/04 |
| EP | 2060970 A1 | 5/2009 | |

(Continued)

OTHER PUBLICATIONS

Title: A Novel Graphical UI Design for Futures Trading Author: Changjiang Zhang Date: Oct. 1, 2015 (Year: 2015).*

(Continued)

*Primary Examiner* — Christopher Bridges
*Assistant Examiner* — Yongsik Park
(74) *Attorney, Agent, or Firm* — Jen Slotterback

(57) ABSTRACT

The state of a trade order may be defined and/or maintained in response to user action at a trading device. A trading device may receive a user action on a graphical user interface (GUI). The user action may cause the submission of the trade order to the electronic exchange. The trading device may receive a user action on the GUI to define an active order state. The trading device may maintain the order state until receiving an identified user action on the GUI to change the order state to inactive, which may cause the trade order to be canceled or held at the electronic exchange. The user action causing the change in the order state may be an active use action, such as a selection, or a passive user action, such as a failure to perform a selection. Such user action may encourage user attention when managing trade orders.

7 Claims, 9 Drawing Sheets

(56) References Cited

U.S. PATENT DOCUMENTS

| | | | |
|---|---|---|---|
| 7,546,550 B1* | 6/2009 | Buck | G06F 3/0482 715/834 |
| 7,554,530 B2 | 6/2009 | Mizobuchi et al. | |
| 7,559,036 B1 | 7/2009 | Buck | |
| 7,580,883 B2 | 8/2009 | Borts | |
| 7,627,517 B2* | 12/2009 | Badenhorst | G06Q 40/04 345/619 |
| 7,702,568 B1* | 4/2010 | Tanpoco | G06Q 40/00 705/37 |
| 7,702,569 B1* | 4/2010 | Tanpoco | G06Q 40/04 705/37 |
| 7,752,122 B2* | 7/2010 | Friesen | G06Q 40/06 705/37 |
| 7,788,604 B2 | 8/2010 | Wasko et al. | |
| 7,818,691 B2 | 10/2010 | Irvine | |
| 8,027,908 B2 | 9/2011 | Borts | |
| 8,037,422 B1 | 10/2011 | Buck | |
| 8,174,503 B2 | 5/2012 | Chin | |
| 8,201,109 B2 | 6/2012 | Van Os et al. | |
| 8,239,784 B2 | 8/2012 | Hotelling et al. | |
| 8,416,217 B1 | 4/2013 | Eriksson et al. | |
| 8,442,890 B2 | 5/2013 | Brumfield et al. | |
| 8,578,288 B2 | 11/2013 | Wasko et al. | |
| 8,587,519 B2 | 11/2013 | Shaw et al. | |
| 8,620,794 B2 | 12/2013 | Borts | |
| 8,633,903 B2 | 1/2014 | Kim et al. | |
| 8,713,478 B2 | 4/2014 | Buck | |
| 9,268,966 B1 | 2/2016 | Amacker et al. | |
| 9,727,915 B2 | 8/2017 | Singer | |
| 2004/0150668 A1 | 8/2004 | Myers et al. | |
| 2004/0246240 A1 | 12/2004 | Kolmykov-Zotov et al. | |
| 2005/0004852 A1 | 1/2005 | Whitney | |
| 2005/0089225 A1 | 4/2005 | Chang et al. | |
| 2006/0026536 A1 | 2/2006 | Hotelling et al. | |
| 2006/0129475 A1 | 6/2006 | Badenhorst et al. | |
| 2006/0259384 A1* | 11/2006 | Schluetter | G06Q 20/10 705/35 |
| 2006/0284893 A1 | 12/2006 | Hlad et al. | |
| 2007/0139370 A1 | 6/2007 | Lu et al. | |
| 2007/0150401 A1 | 6/2007 | Brucato et al. | |
| 2007/0152984 A1 | 7/2007 | Ording et al. | |
| 2007/0156565 A1 | 7/2007 | Singer et al. | |
| 2007/0156570 A1 | 7/2007 | Singer et al. | |
| 2007/0208654 A1* | 9/2007 | Stearns | G06Q 40/04 705/37 |
| 2007/0265954 A1* | 11/2007 | Mather | G06F 3/0481 705/37 |
| 2008/0025645 A1 | 1/2008 | Jakobson et al. | |
| 2008/0117168 A1 | 5/2008 | Liu et al. | |
| 2008/0243710 A1 | 10/2008 | Borts | |
| 2009/0027338 A1 | 1/2009 | Weinberg et al. | |
| 2009/0319950 A1 | 12/2009 | Borts | |
| 2010/0020035 A1 | 1/2010 | Ryu et al. | |
| 2010/0042954 A1 | 2/2010 | Rosenblatt et al. | |
| 2010/0088654 A1 | 4/2010 | Henhoeffer | |
| 2010/0162139 A1 | 6/2010 | Beebe et al. | |
| 2010/0269040 A1 | 10/2010 | Lee | |
| 2010/0283742 A1 | 11/2010 | Lam | |
| 2010/0289754 A1 | 11/2010 | Sleeman et al. | |
| 2010/0306693 A1 | 12/2010 | Brinda | |
| 2010/0332368 A1* | 12/2010 | Alderucci | G06Q 40/04 705/37 |
| 2010/0333195 A1 | 12/2010 | Wang | |
| 2011/0080351 A1 | 4/2011 | Wikkerink et al. | |
| 2011/0087581 A1* | 4/2011 | Ram | G06Q 30/0641 705/37 |
| 2011/0088086 A1 | 4/2011 | Swink et al. | |
| 2011/0112952 A1 | 5/2011 | Annunziata et al. | |
| 2011/0138275 A1 | 6/2011 | Yu | |
| 2011/0234491 A1 | 9/2011 | Nurmi | |
| 2011/0256848 A1 | 10/2011 | Bok et al. | |
| 2011/0307371 A1 | 12/2011 | Borts | |
| 2011/0310041 A1 | 12/2011 | Williams et al. | |
| 2011/0320337 A1 | 12/2011 | Buck | |
| 2012/0005059 A1 | 1/2012 | Buck | |
| 2012/0044179 A1 | 2/2012 | Hudson | |
| 2012/0046079 A1 | 2/2012 | Kim et al. | |
| 2012/0068950 A1 | 3/2012 | Conde et al. | |
| 2012/0079586 A1 | 3/2012 | Brown et al. | |
| 2012/0089948 A1 | 4/2012 | Lim et al. | |
| 2012/0123558 A1 | 5/2012 | Gill | |
| 2012/0176401 A1 | 7/2012 | Hayward et al. | |
| 2012/0182226 A1 | 7/2012 | Tuli | |
| 2012/0233571 A1 | 9/2012 | Wever et al. | |
| 2012/0254808 A1 | 10/2012 | Gildfind | |
| 2012/0256959 A1 | 10/2012 | Ye et al. | |
| 2012/0265664 A1 | 10/2012 | Triplett et al. | |
| 2012/0275648 A1 | 11/2012 | Guan | |
| 2012/0284297 A1 | 11/2012 | Aguera-Arcas et al. | |
| 2012/0284673 A1 | 11/2012 | Lamb et al. | |
| 2012/0284789 A1 | 11/2012 | Kim et al. | |
| 2012/0291101 A1 | 11/2012 | Ahlstrom et al. | |
| 2012/0317509 A1 | 12/2012 | Ludwig et al. | |
| 2013/0007666 A1 | 1/2013 | Song et al. | |
| 2013/0063380 A1 | 3/2013 | Wang et al. | |
| 2013/0093705 A1 | 4/2013 | Huang | |
| 2013/0093707 A1 | 4/2013 | Park et al. | |
| 2013/0111379 A1 | 5/2013 | Hong et al. | |
| 2013/0113714 A1 | 5/2013 | Mao | |
| 2013/0127592 A1 | 5/2013 | Fyke et al. | |
| 2013/0159927 A1 | 6/2013 | Chuang et al. | |
| 2013/0162513 A1 | 6/2013 | Ronkainen | |
| 2013/0167074 A1 | 6/2013 | Oonishi et al. | |
| 2013/0169549 A1 | 7/2013 | Seymour et al. | |
| 2013/0283215 A1 | 10/2013 | Sundaramurthy et al. | |
| 2013/0297474 A1 | 11/2013 | Creamer et al. | |
| 2013/0311955 A9 | 11/2013 | de Leon | |
| 2013/0312083 A1 | 11/2013 | Farraro et al. | |
| 2014/0035843 A1 | 2/2014 | Zo et al. | |
| 2014/0055235 A1 | 2/2014 | Choi | |
| 2014/0085271 A1 | 3/2014 | Hwang et al. | |
| 2014/0085460 A1 | 3/2014 | Park et al. | |
| 2014/0143785 A1 | 5/2014 | Mistry et al. | |
| 2014/0157209 A1 | 6/2014 | Dalal et al. | |
| 2014/0191986 A1 | 7/2014 | Kim et al. | |
| 2014/0195411 A1 | 7/2014 | Buck | |
| 2014/0229359 A1 | 8/2014 | Borts | |
| 2014/0253461 A1 | 9/2014 | Hicks et al. | |
| 2014/0279344 A1 | 9/2014 | Creamer et al. | |
| 2014/0358782 A1 | 12/2014 | Gura et al. | |
| 2015/0029225 A1 | 1/2015 | Aigner | |
| 2015/0081502 A1 | 3/2015 | Singer | |
| 2015/0082252 A1 | 3/2015 | Chaudhri et al. | |
| 2015/0088722 A1 | 3/2015 | Singer | |
| 2015/0160788 A1 | 6/2015 | Sun et al. | |
| 2015/0186028 A1 | 7/2015 | Singer et al. | |
| 2016/0224119 A1 | 8/2016 | Wu | |
| 2017/0301023 A1 | 10/2017 | Singer | |

FOREIGN PATENT DOCUMENTS

| | | | |
|---|---|---|---|
| EP | 2597585 A1 | 5/2013 | |
| EP | 2608007 A2 | 6/2013 | |
| FR | 2985583 A1 | 7/2013 | |
| RU | 2439653 C2 | 1/2012 | |
| WO | WO-03090032 A2 * | 10/2003 | G06Q 40/04 |

OTHER PUBLICATIONS

Anonymous: "FingerWorks—Gesture Guide—File Operations", Internet Citation, Jun. 18, 2004, XP002404589, Retrieved from the Internet: URL:http://web.archive.org/web/20040618040236/www.fingerworks.com/gesture guide files.html, [retrieved on Oct. 26, 2006], p. 1.

Villamor, C., et al.: "Touch Gesture Reference Guide ", Apr. 15, 2010, XP055024104, Retrieved from the Internet: URL:http://web.archive.org/web/20100601214053/http://www.lukew.com/touch/TouchGestureGuide.pdf [retrieved on Apr. 10, 2012], p. 1.

Extended European Search Report in European Patent Application No. 14874482.4 dated Aug. 7, 2017, mailed Aug. 18, 2017.

(56) References Cited

OTHER PUBLICATIONS

International Search Report and Written Opinion of International Application No. PCT/US2014/068783, dated Jan. 29, 2015 (mailed Mar. 3, 2015).
Unpublished U.S. Appl. No. 12/504,412, filed April Jul. 16, 2009.

* cited by examiner

USER ACTION FOR CONTINUED PARTICIPATION IN MARKETS

BACKGROUND

An electronic trading system generally includes a trading device in communication with an electronic exchange. The trading device receives information about a market, such as prices and quantities, from the electronic exchange. The electronic exchange receives messages, such as messages related to orders, from the trading device. The electronic exchange attempts to match quantity of an order with quantity of one or more contra-side orders.

Trading in such an electronic trading system may demand a relatively high level of user attention. A user of the trading device may be managing multiple trade orders at one or more electronic exchanges. As such, the user may be distracted from managing a trade order, while tending to other trade orders. There may even be times when a user of the trading device may lack a physical presence at the trading device. In such situations, the user's lack of physical presence or attention may cause trade orders to go unmanaged.

BRIEF DESCRIPTION OF THE FIGURES

Certain embodiments are disclosed with reference to the following drawings.

Figure 1:
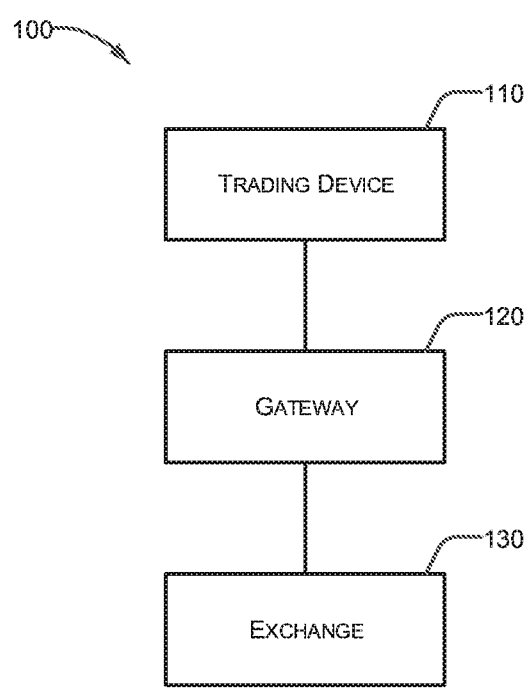
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

Systems, methods, and instrumentalities may be described for defining and maintaining an order state of a trade order to an electronic exchange based on user actions. A user may submit a trade order to an electronic exchange. The user may submit the trade order to the electronic exchange by selecting an order entry portion of a user interface. The order entry portion may be selected via a mouse click, a finger press, or another form of selection.

The user interface may provide a selection indicator to display the portion of the user interface selected by user. Upon the user selecting a portion of the user interface, the trade order may be provided to an action manager residing on the trading device (e.g., on a trading terminal, a trading server, or a combination of trading terminal and the trading server). Upon the user selecting a portion of the user interface, the action manager may submit the corresponding trade order to the electronic exchange.

The user may select a portion of the user interface to define a state associated with and descriptive of the status of a trade order. The portion of the user interface to define a state of the trade order may be the same portion, or a different portion, as the portion of the user interface used to submit the trade order. For example, the user may select a state button to define and/or maintain the state of the trade order. An indication of the user's selection may be provided to the action manager. The indication of the selection of the state button may be used by the action manager to define and/or maintain the state of a trade order.

The user may select a portion of the user interface to define the state of the trade order as being active. The user may perform a user action on the user interface to change the state of the trade order to inactive. For example, the user may release a selection of the portion of the user interface (e.g., releasing a finger press, an upclick of the mouse, etc.), select the portion of the user interface again, or fail to select a portion of the user interface within a predefined period of time to change the state of the trade order to inactive. The user action causing the change in the order state may be an active use action, such as a selection, or a passive user action, such as a failure to perform a selection. The active state may indicate that the trade order is working at the electronic exchange. The inactive state may indicate that the trade order is held or canceled at the electronic exchange.

The user may perform an action to maintain the state of the trade order as active. For example, the user may continue to the select a portion of the user interface, or select a portion of the user interface within a predefined period of time, to maintain the trade order as a working order. Such actions may ensure the attention of the user for management of trade orders.

Upon a change of the state of a trade order, the action manager may generate an order update. The order update may indicate the state change of the trade order. The action manager may send the order update to the electronic exchange. The user interface may be updated to reflect the change in the status of the trade order Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

A system, method, and instrumentality may be described for submitting a trade order to an electronic exchange. A trading device may receive a first user action on a graphical user interface (GUI). The first user action may result in the submission of the trade order to the electronic exchange. The trade order submitted to the electronic exchange may be sent to an action manager. The trading device may receive a second user action via the GUI. The action manager may define a first order state that may be established in response to the second user action. The trading device may receive a third user action on the GUI. The action manager may define a second order state that may be established in response to the third user action. The action manager may generate an order update to the trade order and may send the order update to the electronic exchange.

The first user action and/or the second user action may be a click (e.g., an upclick, a downclick, etc.) action. The click action of the first user action may be the same as, and/or different from, the click action of the second user action. For example, the first user action may be an upclick action and the second user action may be an upclick action. Alternatively, the first user action may be an upclick action and the second user action may be a downclick action, or vice-versa. The first user action may occur at a first time and the second user action may occur at a second time. The second time may occur at a time that is before the first time and/or the second time may occur at a time that is after the first time. For example, the second user action may occur at a time that is before the first user action and/or the second user action may occur at a time that is after the first user action. The third user action may be a click action that may be a downclick action and/or an upclick action.

The first portion of the graphical user interface may be a first graphical element. The second portion of the graphical user interface may be a first graphical element and/or a second graphical element. For example, the first portion of the graphical user interface may be a first graphical element at a first time and/or the second portion of the graphical user interface may be a first graphical element at a second time. The first graphical element may be a buy button, a sell button, a maintain button, and/or a confirmation button. The second graphical element may be a maintain button and/or a confirmation button.

The first order state may be an active state. The second order state may be an inactive state (e.g., a trade order cancel state or a trade order hold state). The first order state may correspond to a periodic update communicated from the trading device to the action manager. The order update may be an order cancellation message.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication with" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market.

The price levels associated with the inside market and market depth can be provided as value levels which can encompass prices as well as derived and/or calculated representations of value. For example, value levels may be displayed as net change from an opening price. As another example, value levels may be provided as a value calculated from prices in two other markets. In another example, value levels may include consolidated price levels.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange, a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object; a command to initiate managing orders according to a defined trading strategy; a command to change, modify, or cancel an order; an instruction to an electronic exchange relating to an order; or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. ("Trading Technologies"). As another example, the trading device 110 may be a server running a trading application providing automated trading tools such as ADL®, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, a group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may be implemented utilizing computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a cellular network, a peer-to-peer network, a T1 line, a T3 line, an integrated services digital network ("ISDN") line, a point-of-presence, the Internet, a shared memory system and/or a proprietary network such as TTNET™ provided by Trading Technologies, for example.

The gateway 120 may include one or more electronic computing platforms. For example, the gateway 120 may be implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a wireless network, a virtual private network, a cellular network, a peer-to-peer network, a T1 line, a T3 line, an ISDN line, a point-of-presence, the Internet, a shared memory system, and/or a proprietary network such as TTNET™ provided by Trading Technologies, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. Once an order to buy or sell a tradeable object is received and confirmed by the exchange, the order is considered to be a working order until it is filled or cancelled. If only a portion of the quantity of the order is matched, then the partially filled order remains a working order. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
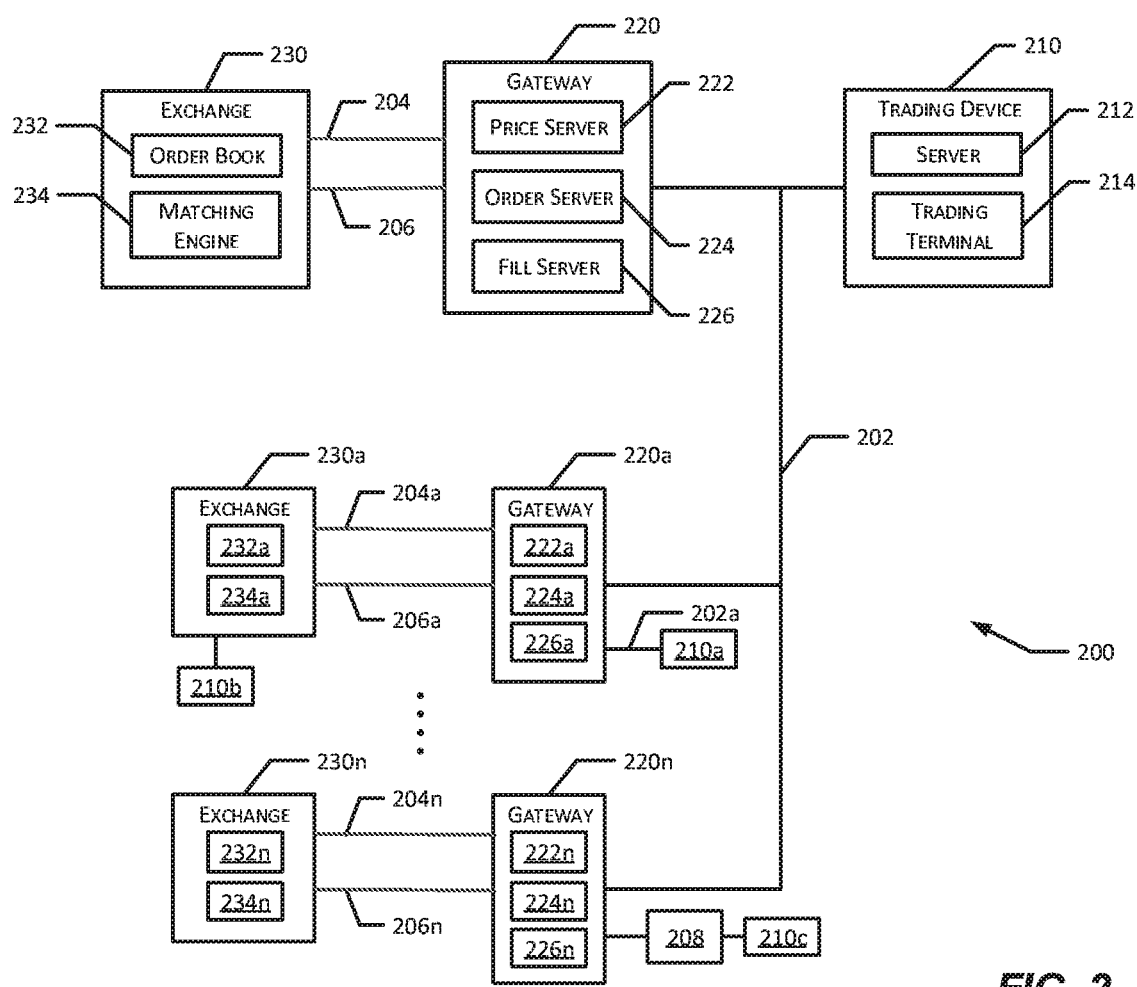
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210 may utilize one or more communication networks to communicate with a gateway 220 and exchange 230. For example, the trading device 210 utilizes network 202 to communicate with the gateway 220, and the gateway 220, in turn, utilizes the networks 204 and 206 to communicate with the exchange 230. As used herein, a network facilitates or enables communication between computing devices such as the trading device 210, the gateway 220, and the exchange 230.

The following discussion generally focuses on the trading device 210, gateway 220, and the exchange 230. However, the trading device 210 may also be connected to and communicate with "n" additional gateways (individually identified as gateways 220a-220n, which may be similar to gateway 220) and "n" additional exchanges (individually identified as exchanges 230a-230n, which may be similar to exchange 230) by way of the network 202 (or other similar networks). Additional networks (individually identified as networks 204a-204n and 206a-206n, which may be similar to networks 204 and 206, respectively) may be utilized for communications between the additional gateways and exchanges. The communication between the trading device 210 and each of the additional exchanges 230a-230n need not be the same as the communication between the trading device 210 and exchange 230. Generally, each exchange has its own preferred techniques and/or formats for communicating with a trading device, a gateway, the user, or another exchange. It should be understood that there is not necessarily a one-to-one mapping between gateways 220a-220n and exchanges 230a-230n. For example, a particular gateway may be in communication with more than one exchange. As another example, more than one gateway may be in communication with the same exchange. Such an arrangement may, for example, allow one or more trading devices 210 to trade at more than one exchange (and/or provide redundant connections to multiple exchanges).

Additional trading devices 210a-210n, which may be similar to trading device 210, may be connected to one or more of the gateways 220a-220n and exchanges 230a-230n. For example, the trading device 210a may communicate with the exchange 230a via the gateway 220a and the networks 202a, 204a and 206a. In another example, the trading device 210b may be in direct communication with exchange 230a. In another example, trading device 210c may be in communication with the gateway 220n via an intermediate device 208 such as a proxy, remote host, or WAN router.

The trading device 210, which may be similar to the trading device 110 in FIG. 1, includes a server 212 in communication with a trading terminal 214. The server 212 may be located geographically closer to the gateway 220 than the trading terminal 214 in order to reduce latency. In operation, the trading terminal 214 may provide a trading screen to a user and communicate commands to the server 212 for further processing. For example, a trading algorithm may be deployed to the server 212 for execution based on market data. The server 212 may execute the trading algorithm without further input from the user. In another example, the server 212 may include a trading application providing automated trading tools and communicate back to the trading terminal 214. The trading device 210 may include additional, different, or fewer components.

In operation, the network 202 may be a multicast network configured to allow the trading device 210 to communicate with the gateway 220. Data on the network 202 may be logically separated by subject such as, for example, by prices, orders, or fills. As a result, the server 212 and trading terminal 214 can subscribe to and receive data such as, for example, data relating to prices, orders, or fills, depending on their individual needs.

The gateway 220, which may be similar to the gateway 120 of FIG. 1, may include a price server 222, order server 224, and fill server 226. The gateway 220 may include additional, different, or fewer components. The price server 222 may process price data. Price data includes data related to a market for one or more tradeable objects. The order server 224 processes order data. Order data is data related to a user's trade orders. For example, order data may include order messages, confirmation messages, or other types of messages. The fill server collects and provides fill data. Fill data includes data relating to one or more fills of trade orders. For example, the fill server 226 may provide a record of trade orders, which have been routed through the order server 224, that have and have not been filled. The servers 222, 224, and 226 may run on the same machine or separate machines. There may be more than one instance of the price server 222, the order server 224, and/or the fill server 226 for gateway 220. In certain embodiments, the additional gateways 220a-220n may each includes instances of the servers 222, 224, and 226 (individually identified as servers 222a-222n, 224a-224n, and 226a-226n).

The gateway 220 may communicate with the exchange 230 using one or more communication networks. For example, as shown in FIG. 2, there may be two communication networks connecting the gateway 220 and the exchange 230. The network 204 may be used to communicate market data to the price server 222. In some instances, the exchange 230 may include this data in a data feed that is published to subscribing devices. The network 206 may be used to communicate order data to the order server 224 and the fill server 226. The network 206 may also be used to communicate order data from the order server 224 to the exchange 230.

The exchange 230, which may be similar to the exchange 130 of FIG. 1, includes an order book 232 and a matching engine 234. The exchange 230 may include additional, different, or fewer components. The order book 232 is a database that includes data relating to unmatched trade orders that have been submitted to the exchange 230. For example, the order book 232 may include data relating to a market for a tradeable object, such as the inside market, market depth at various price levels, the last traded price, and the last traded quantity. The matching engine 234 may match contra-side bids and offers pending in the order book 232. For example, the matching engine 234 may execute one or more matching algorithms that match contra-side bids and offers. A sell order is contra-side to a buy order. Similarly, a buy order is contra-side to a sell order. A matching algorithm may match contra-side bids and offers at the same price, for example. In certain embodiments, the additional exchanges 230a-230n may each include order books and matching engines (individually identified as the order book 232a-232n and the matching engine 234a-234n, which may be similar to the order book 232 and the matching engine 234, respectively). Different exchanges may use different data structures and algorithms for tracking data related to orders and matching orders.

In operation, the exchange 230 may provide price data from the order book 232 to the price server 222 and order data and/or fill data from the matching engine 234 to the order server 224 and/or the fill server 226. Servers 222, 224, 226 may process and communicate this data to the trading device 210. The trading device 210, for example, using a trading application, may process this data. For example, the data may be displayed to a user. In another example, the data may be utilized in a trading algorithm to determine whether a trade order should be submitted to the exchange 230. The trading device 210 may prepare and send an order message to the exchange 230.

In certain embodiments, the gateway 220 is part of the trading device 210. For example, the components of the gateway 220 may be part of the same computing platform as the trading device 210. As another example, the functionality of the gateway 220 may be performed by components of the trading device 210. In certain embodiments, the gateway 220 is not present. Such an arrangement may occur when the trading device 210 does not need to utilize the gateway 220 to communicate with the exchange 230, such as if the trading device 210 has been adapted to communicate directly with the exchange 230.

IV. Example Computing Device

Figure 3:
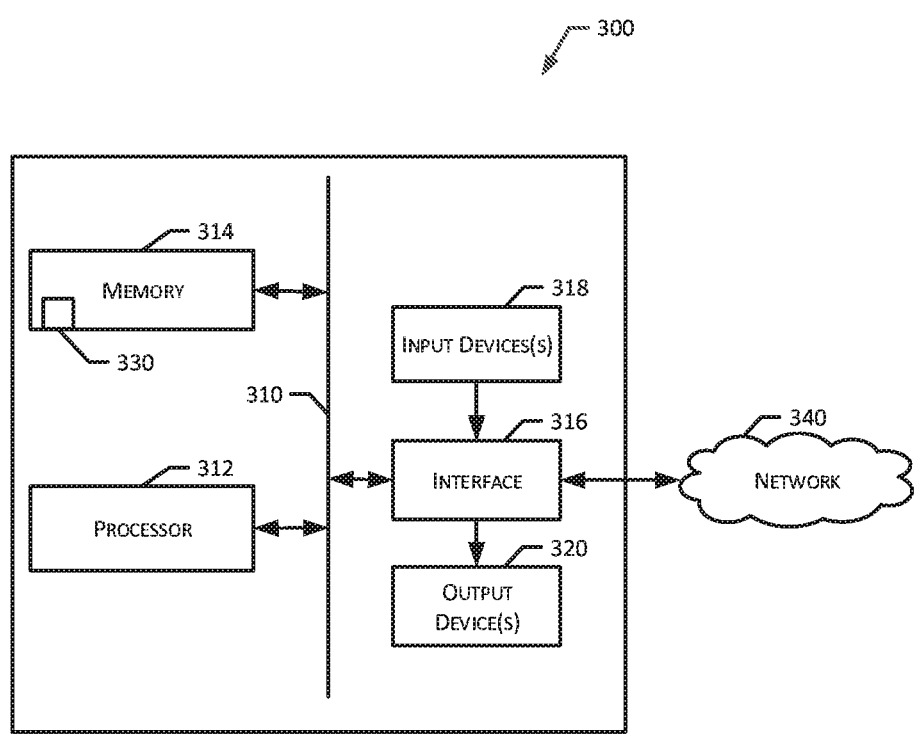
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. User Action to Maintain Trade Orders

FIGS. 4A-4D illustrate an example user interface 400 that may be implemented on a computing device to allow a user to provide a user action for continued participation in a market. Market data may include data about a market for a tradeable object. For example, market data may include the inside market, market depth, last traded price ("LTP"), a last traded quantity ("LTQ"), or a combination thereof. The inside market refers to the highest available bid price (best bid) and the lowest available ask price (best ask or best offer) in the market for the tradeable object at a particular point in time (since the inside market may vary over time). Market depth refers to quantities available at price levels including the inside market and away from the inside market. Market depth may have "gaps" due to prices with no quantity based on orders in the market. The market data may be received as a cumulative batch of data for display in a trading window or data calculated over a period of time at the computing device. The user interface 400 may be generated locally at a computing device, such as a trading terminal, for display.

Referring to the example system 200 in FIG. 2, the user interface 400 may be generated locally at the trading terminal 214. The user interface 400 may be generated at a remote computing device, such as a server, and may be displayed locally at another computing device through an application. Referring again to the example system 200 in FIG. 2, the user interface 400 may be generated at the server 212 and may be displayed at the trading terminal 214 via an application, such as a web browser or other web interface.

As described above in conjunction with FIG. 2, the trading device 210 may receive market data related to one or more tradeable objects from the exchange 230 and/or the exchanges 230a-230n through the gateway 220 and/or the gateways 220a-220n, respectively. The trading device 210 may provide a trading application including trading tools to process and/or organize the market data and provide the example user interface 400. Trading tools include, for example, TT®, MD TRADER®, X TRADER®, ADL®, AUTOSPREADER®, and AUTOTRADER™, each provided by Trading Technologies. The trading device 210 provides the trading interface 400 to enable a user to view market data and communicate trade orders and trade actions with an electronic exchange.

Figure 4A:
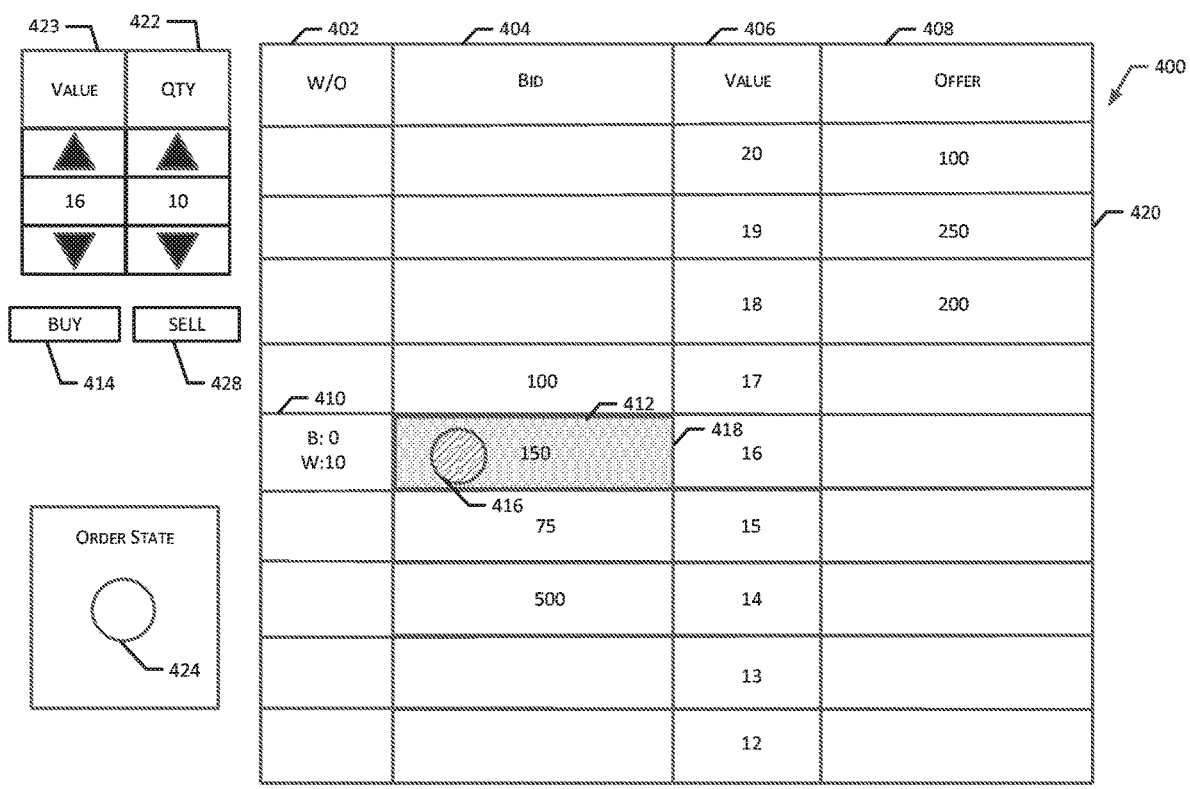
FIGS. 4A-4D illustrate an example user interface that may be displayed on a computing device to allow a user to provide a user action for continued participation in a market.

In the illustrated example of FIG. 4A, the user interface 400 includes a working order (W/O) column 402, a bid column 404, a value column 406, and an offer column 408. The user interface 400 may include other columns such as a last traded quantity (LTQ)/last traded price (LTP) column, a single combined bid/ask column, an estimated position-in-queue column, a user-defined indicator column, an inside market indicator column, and/or any other column for providing indicators. The user interface 400 also includes rows. The columns intersect with the rows to define cells such as cell 418 and cell 420. In other embodiments, different orientations other than vertical columns may be used (e.g., horizontal and diagonal arrangements).

In the illustrated example of FIG. 4A, bid indicators representing the bid quantities of the tradeable object are displayed in the bid column 402, value indicators corresponding to value levels are displayed in the value column 406, and offer indicators representing the offer quantities of the tradeable object are displayed in the offer column 408. A bid quantity is a quantity available on the bid side of the tradeable object at a given value level. The value levels may be configured to represent prices, net change, derivatives of price, consolidated prices, synthetic tradeable object pricing, spread pricing, and/or other representations of value. The offer quantity is a quantity available on the offer side of the tradeable object at a given value level. The indicators are not limited to numerical values and may include any type or combination of indicator or symbol to illustrate the presence of available quantity without providing a specific numeric value. For example, the indicators may include text, icons, colors, lines, and/or other graphical representations. In one example, the indicators may represent a range of quantity available at particular value levels in place of specific, and frequently changing, quantity values. In another example, the relative size of indicators may proportionally represent the quantity available. In another example, the indicators may represent simply that there is quantity available with no illustration of the amount in excess of zero.

From the user's perspective, the user interface 400 may present and display indicators in a manner that conveys the appearance of movement relative to the value column 406. For example, the manner in which the user interface 400 alters the position of the bid indicators and the offer indicators relative to the value levels within the value column 406 may allow the user to perceive changes in both the speed and direction of trading within a market. The user interface 400 updates based on received market data. For example, the user interface 400 may move the bid indicators relative to the value column 404 when the received market data includes an updated quantity at a bid price. The user interface 400 may similarly move the offer indicators relative to the value column 404 when the received market data includes an updated quantity at an offer price.

The quantity indicators that are displayed as part of the trading interface 400 may each represent a quantity of trade orders in an order queue associated with the tradeable object at a corresponding price. For example, the bid quantity indicator in cell 418 adjacent to the price of "16" may represent a quantity of trade orders in an order queue for buying the tradeable object at the price of "16." The value "150" may indicate that the aggregated quantity of "buy" orders pending in the order queue for the tradeable object at the price of "16" is one hundred fifty (150). Similarly, the offer quantity indicator in cell 420 adjacent to the price of "19" may represent an order queue for selling the tradeable object at the price of "19." The value "250" may indicate that the aggregated quantity of "sell" orders pending in the order queue for the tradeable object at the price of "19" is two hundred fifty (250). Thus, upon placing an order to buy or sell the tradeable object, a user may look at the quantity indicators in cell 418 or cell 420 respectively to determine a quantity currently pending at the exchange.

The working order column 402 may indicate the current position of a user's working orders at the electronic exchange. Working order indicators representing the quantities of the tradeable object working for a user at the electronic exchange are displayed in the working order column 402. The working order indicators may indicate the quantity that is currently working at an exchange and/or the quantity that has been matched in a cell, such as the cell 410. For example, a user may have placed, e.g., through an order quantity setting component 422 of the user interface 400, a "buy" order for ten (10) tradeable objects. The order may be displayed in the user interface 400 as a "working order" with an order quantity of ten (10) being displayed in the cell 410 (e.g., shown as "W:10" in cell 410). The order quantity submitted in the trade order is indicated as being a part of the total bid quantity indicated in the cell 418 that is pending at the electronic exchange at the value of "16." The symbol "B:0" may indicate that zero tradeable objects have been matched from the working order at the electronic exchange. As the quantity of the working order, or portions thereof, are matched, the indicator in the cell 410 may be updated to reflect the quantity matched and the quantity still working. A similar symbol of "S:0" may indicate that zero tradeable objects have been matched for a working offer at the electronic exchange. The market data in the trading interface 400 may be updated as market updates are received from the electronic exchange.

The user may submit a trade order to the electronic exchange by setting an order quantity setting component 422 and selecting an order entry portion of the user interface 400. The user may select order entry portion of the user interface to submit the trade order. The order entry portion of the user interface 400 may be a cell indicating a bid or an offer to be submitted. For example, the user may select the cell 418 or the cell 420 for submitting a bid or an offer, respectively, at the corresponding value in the value column 406. The user selections described herein may occur via a mouse click, a finger press, or other user action.

The order entry portion of the user interface 400 may be the buy button 414 for submitting a bid and/or the sell button 428 for submitting an offer, respectively. When using the buy button 414 and/or the sell button 428, the user may select the order value using the order value setting component 423 or by selecting an indication of value in the value column 406 prior to placing the trade order. Though the buy button 414 and the sell button 428 are shown as buttons, other graphical elements may be implemented.

A user may select a quantity using the order quantity setting component 422 prior to placing the trade order. For example, the user may select a quantity of ten (10), as shown in FIG. 4A. The user may select the type of order to be submitted (e.g., bid or offer). The trade order may be submitted upon the user selecting the order entry portion of the user interface 400. The trade order may include the corresponding price of "16" in the value column 406 and the quantity indicated using the order quantity setting component 422. The number of working orders specified in working order column 402 may be updated accordingly.

The user interface 400 may provide a selection indicator 416 to display the portion of the user interface 400 selected by user. The selection indicator 416 may be any shape, color, size, etc. that may be used to show that a portion of the user interface 400 is selected. Also, or alternatively, the portion selected on the user interface 400 may be modified to indicate the portion is selected. For example, as shown in FIG. 4A, the cell 418 may include a selection identifier 412 to identify that user has selected cell 418. The selection identifier 412 may be any shade, color, shape, icon, etc. that may identify the order entry portion of the user interface 400 that has been selected. The user interface 400 may show at cell 410 that a quantity of ten (10) is now working at the electronic exchange. Though the order entry portion of the user interface 400 that may be selected for submitting a trade order is described as being a cell, the order entry portion may be otherwise configured in a button or another graphical element capable of receiving a user action.

Upon the user selecting a portion of the user interface 400, the trade order may be provided to or generated at an action manager. Referring again to FIG. 2, the action manager may reside on a trading device, such as trading device 210. The action manager comprise hardware and/or software modules that may be provided on a trading terminal 214, a server 212, and/or a combination of trading terminal 214 and/or server 212. For example, the action manager may be installed on an individual device, such as the trading terminal 214 or the server 212, or may be distributed across multiple devices, such as the trading terminal 214 and the server 212. When the action manager is installed at a remote device, such as the server 212, and the user interface 400 is displayed via a local application, e.g., at the trading terminal 214, the action manager may receive indications from the user that are input via the application executed at the local device. For example, the action manager may receive an indication of the user selection a portion of the user interface 400 and may generate and submit the corresponding trade order to an electronic exchange (such as electronic exchange 230). In another example, the action manager may receive the trade order generated in response to user actions, as well as other user actions on the user interface 400, from another device, such as the trading terminal 214 when the action manager resides on the server 212.

The user may select a portion of the user interface 400 to define a state of the submitted trade order at the action manager. For example, the action manager receives an indication corresponding to a user action at the user interface 400 and may define the state of the trade order. The trade order may be defined in an active state or an inactive state. For example, the action manager maintains the working order at the electronic exchange when the order is in the active state corresponding to a continuous user selection of the portion of the user interface 400. In certain embodiments, the selection of the portion of the user interface 400 may be substantially continuous such that a short discontinuity in the detected selection may not trigger a change in state. The action manager may further have one or more inactive states, such as a hold state or a cancel state, when the working order is in the inactive state. When the trade order is in the hold state, the action manager may send an indication to the electronic exchange to hold the working order at the electronic exchange without allowing the working order to be matched. When the trade order is in the cancel state, the action manager may send an indication to the electronic exchange to withdraw the trade order, or any portion thereof, currently working at the electronic exchange.

The portion of the user interface 400 used to define a state of the submitted trade order may be the same portion, or a different portion, as the portion of the user interface 400 used to submit the trade order (e.g., the order entry portion). Referring again to FIG. 4A, the portion of the user interface 400 to define a state of the submitted trade order may be cell 418, buy button 414, sell button 428, or another portion of the user interface 400. The state may be set by the action manager when the action manager receives an indication that a user selects the order entry portion to submit the trade. When the trade order is generated at another device, the action manager may set the state of the trade order to active upon receiving the trade order, submitting the trade order to the electronic exchange, and/or receiving confirmation of the trade order from the electronic exchange.

The portion of the user interface 400 used to define a state of the submitted trade order may be different than the portion of the user interface 400 used to submit the order. For example, the user interface 400 may include a state button 424 that may be selected to define and/or maintain a state at the action manager. An indication may be provided to the action manager upon the user selection of the state button 424 for the action manager to define and/or maintain the state of the trade order. The state button 424 may be a confirmation button that provides an indication to the action manager that confirms the submission of the trade order to the electronic exchange. The action manager may set the state of the trade order to the active state upon receiving an indication of the selection of the confirmation button. The state button 424 may be a maintain button that provides an indication to the action manager to maintain the active state of the trade order. The action manager may set the state of the trade order to the active state upon receiving an indication of the selection of the maintain button. Though the user interface 400 may include a single state button 424, the user interface 400 may include multiple state buttons. For example, the user interface 400 may include a confirmation button for confirming the submission of the trade order to the electronic exchange and a maintain button to be selected to maintain the trade order as a working order. Though the state button 424 is shown as a button, other graphical elements may be implemented.

For example, the user may select the state button 424 on the user interface 400. The state button 424 may correspond to the trade order submitted via the order entry portion, described above. For example, as shown on FIG. 4A, the user may select cell 418 to bid on an order having a price of "sixteen." Upon the user selecting cell 418, a trade order indicating the desired number of trading objects may be submitted to a pre-selected exchange at a price of "sixteen." The user may select state button 424 to define the state of the submitted order. For example, the user selection of the state button 424 may send an indication to the action manager that the state button has been selected and the action manager may define the trade order as a working order. In another example, the trade order may be defined as working upon the receipt of the trade order at the exchange, or in response to a confirmation of the submission of the trade order at the action manager as described herein.

The state button 424 may be used to change the state of a trade order. The state of the trade order may be changed upon another identified user action at the action manager. For example, the user may select the state button 424 to enter an active state and subsequently reselect the state button 424, or another button, to enter an inactive state. The user may also trigger state changes by holding the state button 424 to enter a state and the user may change the state upon releasing the button 424. Upon release of the state button 424 (e.g., by removing a finger press, a pointer press, an up clicking of a mouse, etc.), an indication may be sent to the action manager indicating a change to the state of a trade order. The state of a working order may be changed to an inactive state, such as a hold state or a cancel state. The state of the trade order may be changed immediately upon the user releasing the depression of the state button 424, and/or the state of the trade order may be modified within, and/or upon, a predefined time period of the user releasing the depression of the state button 424. The time period in which the state of the trade order may be modified may be configurable. The user action causing the change in the order state may be an active user action, such as a selection, or a passive user action, such as a failure to perform a selection.

The state button 424 may be used to maintain the state of a trade order. For example, the state button 424 may be selected by a user to maintain a working order in the active state. The user may continue to select the state button 424 (e.g., using a finger press, a pointer press, a downclick of a mouse, etc.). The selection of the state button 424 may send an indication to the action manager to maintain the state of one or more trade orders as working orders. While the user continues to the press the state button 424, the state of the order may be unchanged at the action manager. If the user fails to select the state button 424 within a predefined period of time for maintaining the state of the trade order, an indication may be sent to the action manager and the action manager may change the state of the working order to an inactive state. Though the order entry portion and the state button 424 may be described as being used for a single trade order, the functionality described herein may be implemented for one or more trade orders. For example, the action manager may change the state of one or more working orders to the inactive state upon receiving an indication.

Although the above describes the order entry portion (e.g., cell 418, buy button 414, and/or sell button 428) being used in conjunction with state button 424 to continue and/or change a state of a trade order, the order entry portion may also serve as the state button to maintain and/or change the state of the trade order. For example, as provided above, a user may select the order entry portion (e.g., cell 418, buy button 414, and/or sell button 428) to submit a trade order. The action manager may identify the trade order as being generated and/or submitted to the electronic exchange and may set the state of the trade order as active. After selecting the order entry portion to submit the trade order, the user may perform continued action at the order entry portion to maintain the working order in the active state at the action manager. For example, the user may hold the selection (e.g., a finger press, downclick, etc.) on the order entry portion or continue to select the order entry portion within a predefined period of time to maintain the active state of the trade order at the action manager. The action manager may continue to receive indications that the user is holding the selection of the order entry portion or each time the order entry portion is reselected and maintain the trade order as a working order. Upon the release of the order entry portion, or release of the order entry portion within the predefined period of time, the trade order may be changed to the inactive state (e.g., canceled state or held state). Thus, a user may be able to continue and/or change the state of trade orders with a single press (e.g., finger press) at a single portion of the user interface 400.

To limit processing power being used at a computing device and/or communications over the network, the computing device on which the indications are being received (e.g., the trading device) may monitor the user activity with regard to the state button 424 and/or the order entry button and send an indication to the action manager when the user action changes. For example, the computing device may monitor the user's continued selection of the state button 424 or the order entry portion and indicate to the action manager when the user has failed to select the state button 424 or the order entry portion (e.g., within a predefined period of time), such that the action manager may update the state of the trade order. This may limit the number of messages communicated between the computing device and the action manager.

The trade order may be updated according to the user actions upon user interface 400. For example, as provided above, the state of a trade order may be changed based upon a press and/or a removal of a press. Thus, a trade order may be working upon a press (e.g., a finger press) upon a portion of user interface 400 (e.g., state button 424) and may be canceled upon the press (e.g., finger press) being removed from the portion of the user interface 400. The trade order's change in state may be recorded in a report retained by the action manager. Also, or additionally, upon a change of the state of a trade order, the action manager may generate an order update. For example, upon the user removing a press from state button 424, the action manager may generate an order update. The order update may indicate the state change of the trade order. For example, the order update may be sent to an electronic exchange to hold or cancel the working order. The order update may be sent to a trading device to indicate that one or more trade orders have been canceled or held at the exchange. The user interface 400 may be updated based on the change in the state of the trade order.

The action manager may generate a trade order status report that may include various pieces of information. For example, the trade order status report may include the state changes of the trade order (e.g., that the trade order changed from working to canceled), the time of the state change of the trade order, an indication of the user action (e.g., release of a finger press, release of a down-click of a mouse, etc.), etc. The trade order status report may identify the time after the user action in which the change to the state of the trade order occurred. For example, the trade order status report may identify that a submitted trade order was canceled 15 milliseconds after the user released a press on state button 424. The information provided in the trade order status report may be used to determine the efficiency of the action manager over other trade submission and cancelation techniques. The trade order status report may be viewable by the user to determine user history, performance history, etc.

The computing device on which the user interface 400 is displayed may provide feedback to the user. For example, the computing device may provide feedback to the user to indicate that the user has performed an identified user action (e.g., a finger press, a holding of a finger press for a period of time, a removal of a finger press, a downclick, an upclick, etc.) on a portion of the user interface 400. The computing device may provide the feedback upon the submission of a trade order to the electronic exchange, or confirmation of such submission. Where the computing device comprises a display that is capable of providing haptic communications, the feedback may be provided via haptic feedback. For example, the display on which the user interface 400 is displayed may provide a pulse to the portion of the user interface 400 receiving a finger press from the user. The display on which the user interface 400 is displayed may provide feedback (e.g., haptic feedback) to the user to indicate that the trade order has been defined as a working order, to indicate that the order has been maintained for a predefined period of time, and/or to indicate that the state of the order has changed. For example, the computing device may provide the haptic feedback upon the change of an order to an inactive state, cancelation of a trade order to the electronic exchange, and/or holding of the order at the electronic exchange. The feedback may be provided in response to an indication generated at the action manager upon state changes related to trade orders and/or changes to the working order at the electronic exchange. Although feedback has been described above relating to pulses and haptic feedback, feedback may also, or alternatively, be provided in other ways. For example, feedback may be provided to user via sounds (e.g., beeps), visual notifications (e.g., a notification on the user interface 400, blinking a light emitting diode, etc.), and/or any other way that a computing device may provide feedback to a user.

Figure 4B:
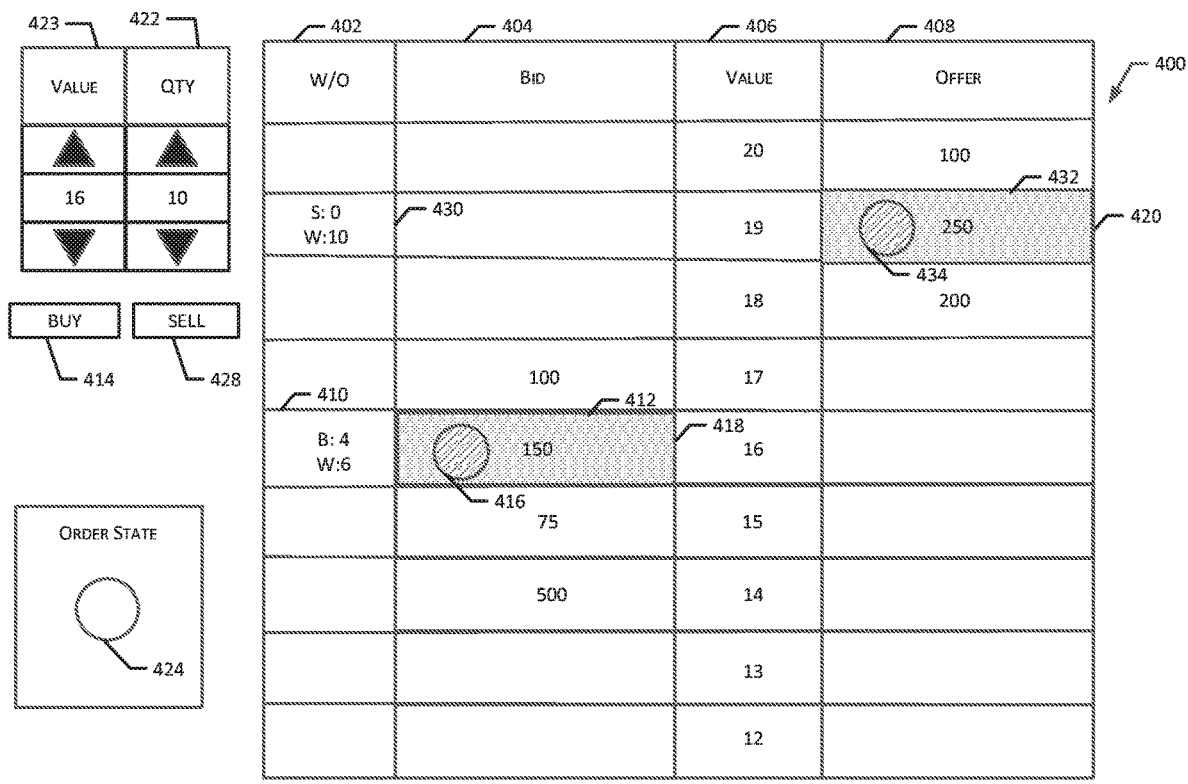

As shown in FIG. 4B, a user may select one or more order entry portions to submit a trade order to an electronic exchange. For example, a user may submit a bid at the price of "16" by selecting cell 418 and an offer at the price of "19" by selecting cell 420. Selection indicator 416 may be used to display the location at which the user selection for the bid was performed. Selection indicator 434 may be used to display the location at which the press for the offer was performed. The cell 420 may include a selection identifier 432 to identify that user has selected cell 420. The selection identifier 432 may be any shade, color, shape, icon, etc. that may identify the order entry portion of the user interface 400 that has been selected. The user may select more than one order entry portion at the same time (e.g., user may press cell 418 and cell 420 at the same time), or the user may select multiple order entry portions at different times (e.g., user may press cell 418 first, and press cell 420 sometime thereafter).

The number of order entry portions that may be selected by user may be limited to the number of objects (e.g., fingers, pointers, mouse clicks, etc.) that the user may use to press order potions. For example, the user may use a finger to select cell 418 to submit a bid at a price of "16," and the user may use another finger to select cell 420 to submit an offer at price of "19." The user may use any number of combinations of objects (e.g., fingers, pointers) and/or mouse clicks when selecting multiple order entry portions when submitting trade orders to the electronic exchange. For example, the user may use a downclick to submit one trade order, and the user may use one or more fingers to submit one or more other trade orders. The user may also, or alternatively, use the buy button 414 and/or the sell button 428 to submit trade orders as described herein.

The cell 430 in working order column 402 may identify the submission of an offer having a quantity of ten (10) at the electronic exchange. State button 424 may be associated with one or more trade orders to maintain and/or change the state of the trade order, as described herein. For example, the user may perform actions to maintain and/or change the state of the working bid indicated in cell 410 and/or the working offer indicated in cell 430.

Figure 4C:
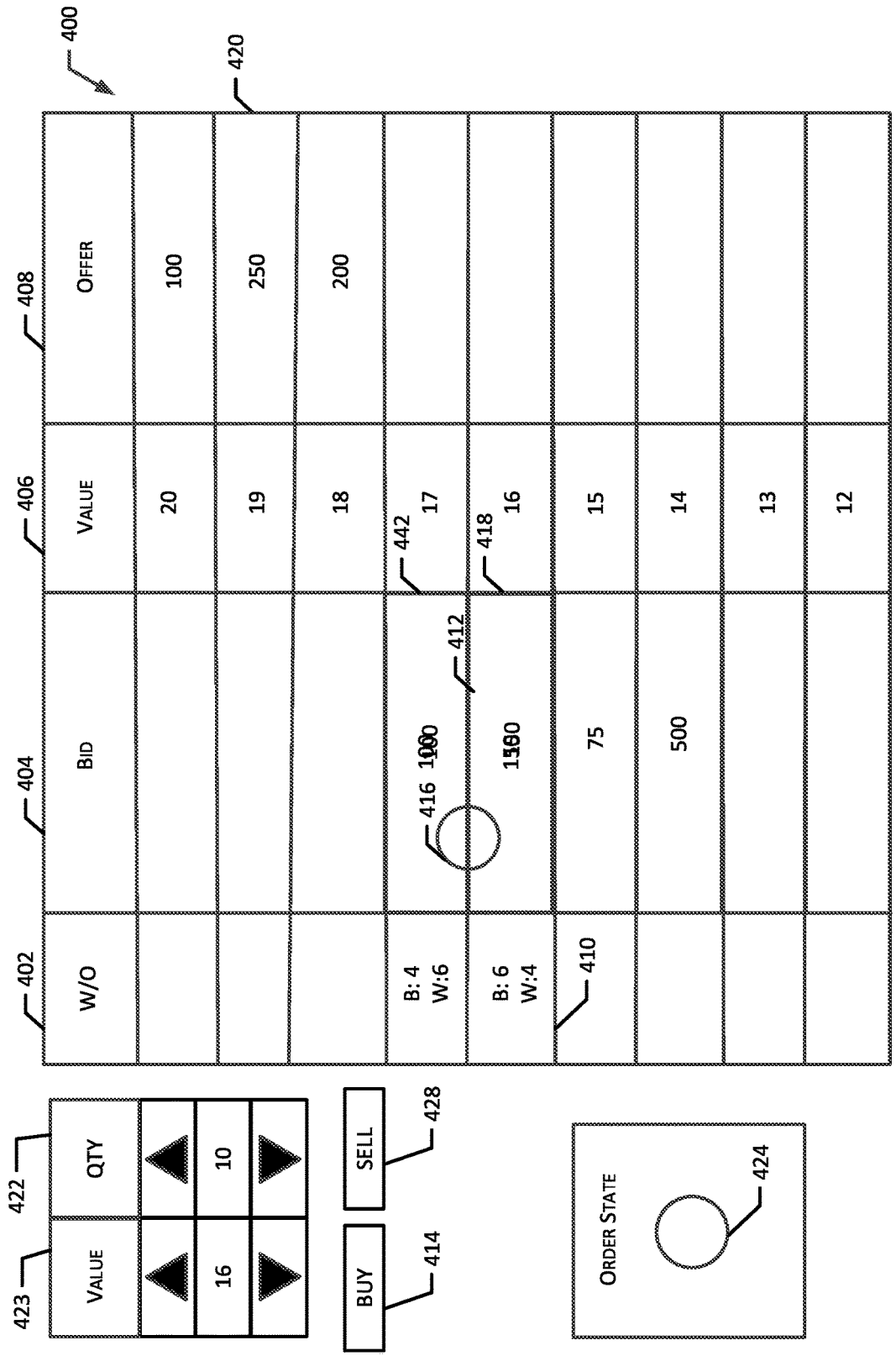

FIG. 4C shows an example having more than one order entry portion selected using a single user action (e.g., a single finger press). For example, FIG. 4C shows a selection indicator 416 that borders cell 418 and cell 442. When a single user action borders multiple order entry portions, the action manager may define and/or maintain the status of one or more trade orders. For example, if a single user action is identified as bordering multiple cells, such as cell 418 and cell 442, the action manager may submit a trade order having the lowest price or at the price having the lowest indicated quantity in the ordering queue at the exchange.

When a single user action borders multiple order entry portions, the action manager may define and/or maintain the status of multiple trade orders. For example, if a single user action is identified as bordering multiple cells, such as cell 418 and cell 442, the action manager may submit a trade order for each indicated cell. The action manager may maintain and/or change the state of the orders together, or separately, based on user actions indicated in the user interface 400.

Figure 4D:
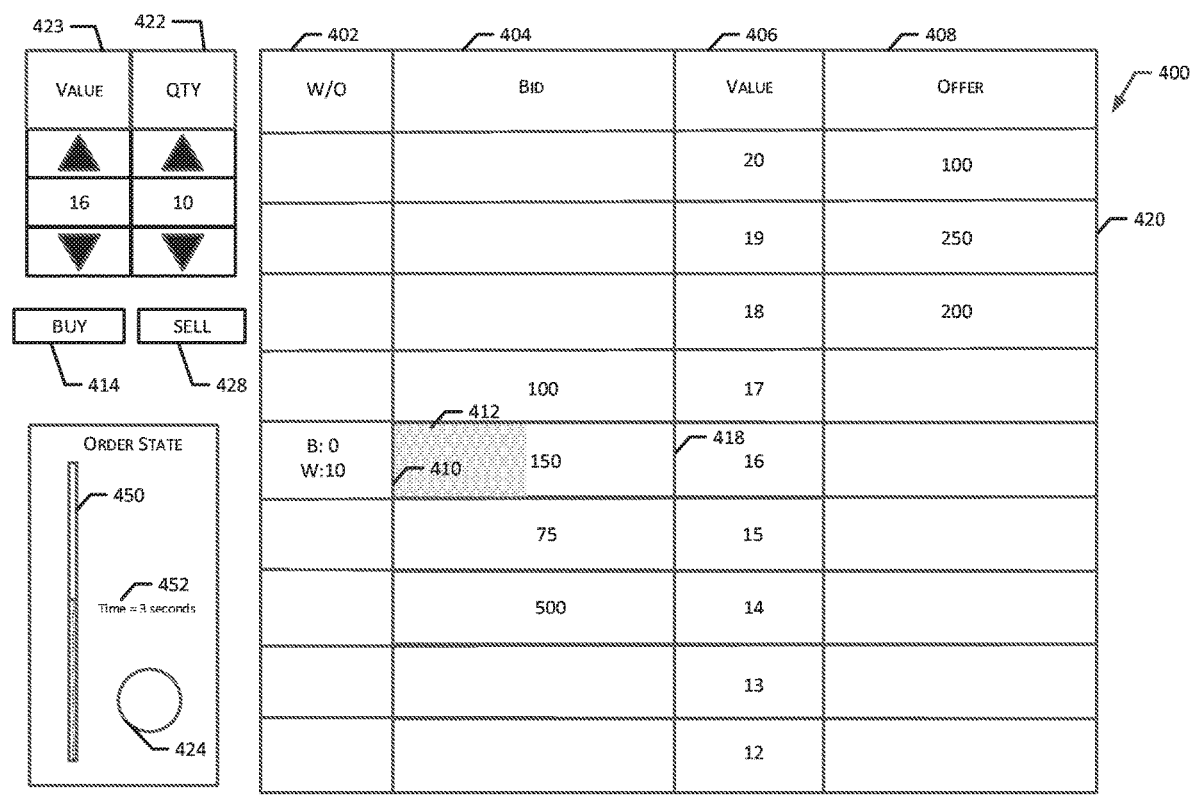

FIG. 4D shows that the example user interface 400 in which a time indication may be provided for indicating an amount of time the order may be maintained as a working order at the electronic exchange. For example, FIG. 4D shows a time indications 450 and 452. Time indications 450, 452 may indicate an amount of time since a prior user action to submit a trade order or maintain the state of the trade order as a working order. The time indications 450, 452 may also indicate an amount of time remaining before the state of an order is changed to inactive (e.g., canceled or held) at the action manager. The selection identifier 412 identifying that the user has selected cell 418 may also, or alternatively, indicate the amount of time since a prior user action to submit a trade order or maintain the state of the trade order as a working order.

A user may select order entry portion 418 to submit an order, and the user may select state button 424 to maintain the active state of the submitted trade order. An indication of the user's action may be sent to the action manager upon selection (e.g., with a finger press, a downclick, etc.) of the state button 424, or upon another user action (e.g., with a release of a finger press, an upclick of a mouse, etc.) at the state button 424. The user may continue to select the state button to maintain the state of the trade order at the action manager. The state of the trade order may be maintained for a predefined time period (e.g., 3 seconds, 6 seconds, 10 seconds, etc.) after the user action. The user interface 400 may provide time indications 450, 452 to indicate the time remaining for which a user may provide another user action to maintain the state of the trade order. For example, the user may select the state button 424 within the predefined time period indicated by time indications 450, 452 to reset the time period. The action manager may identify the user action and may cause the time period to be reset in the user interface 400. The action manager may monitor the user action for the predefined time period to determine whether another user action (e.g., finger press, finger release, downclick, upclick, etc.) is identified prior to the expiration of the time period. If another user action is not identified within the time period, the action manager may change the state of the trade order to the inactive state.

The time indication 450 may graphically show the time remaining before the state of the trade order is changed. As shown on FIG. 4D, time indication 450 may show that there is approximately half of the predetermined time remaining to provide a user action. The user interface 400 may also, or alternatively, provide a numerical time indication 452 to show how much time is left (e.g., 3 seconds remaining) before the state of a trade order may be changed. For example, time indication 452 may indicate that there are 3 seconds remaining before a trade order is changed to the inactive state. If the user provides a user action prior to the expiration of the time remaining (e.g., 3 seconds), the state of the trade order may be maintained at the action manager. The action manager may identify the user action within the time period, reset the predetermined period of time, and cause the display to reset the time indications 450, 452.

Figure 5:
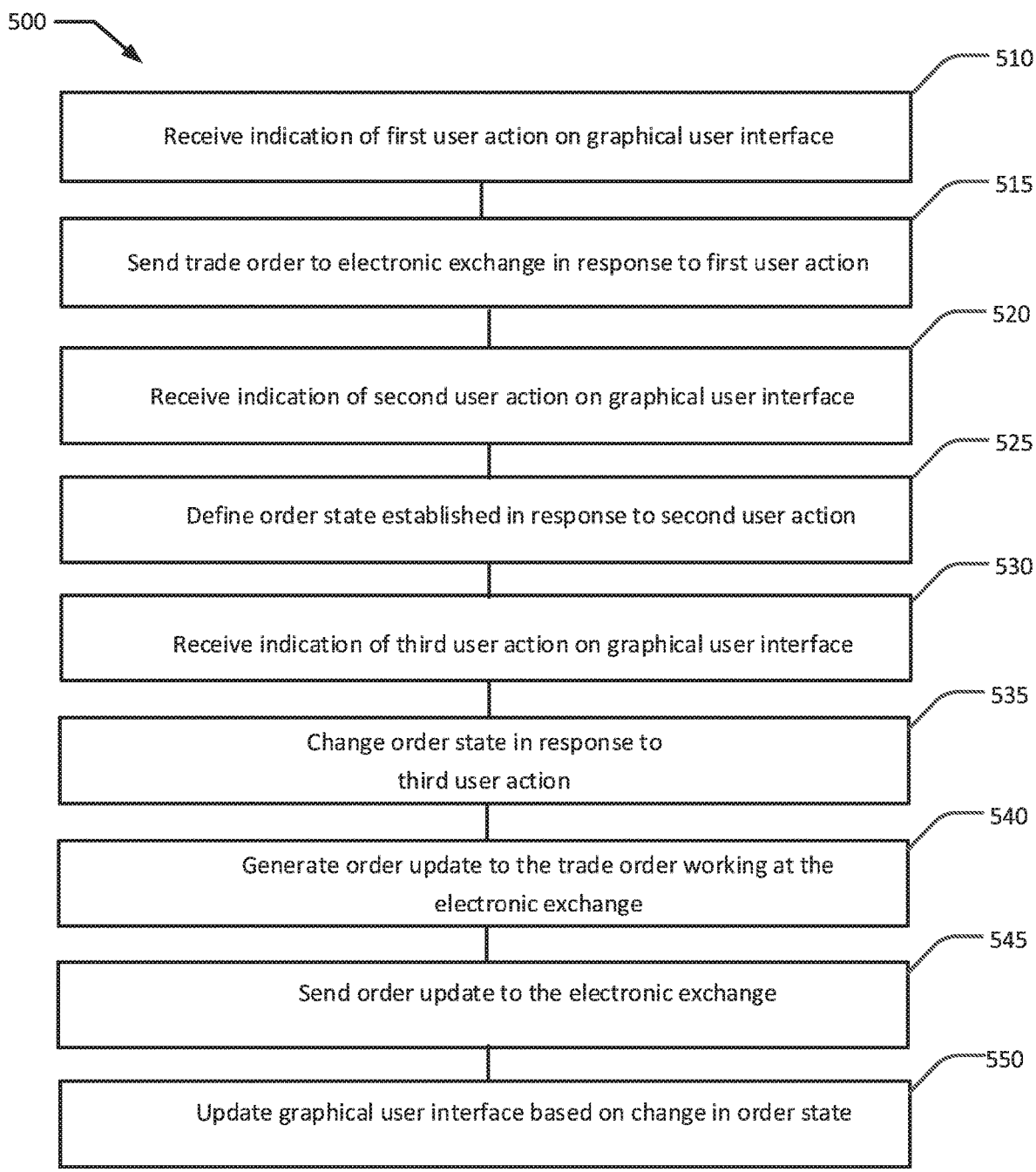
FIG. 5 is a flow diagram of an example method for submitting a trade order to an electronic exchange.

FIG. 5 illustrates a flow diagram of an example method 500 for submitting a trade order at one or more electronic exchanges. The method 500, or portions thereof, may be performed by one or more computing devices. For example, the method 500, or portions thereof, may be performed by an action manager residing on a single computing device or distributed across multiple computing devices.

Referring again to FIG. 2, the computing devices on which the method 500 may be performed may include a trading device 210. For example, the method 500 may be performed at the trading terminal 214, the server 212, or a combination of both.

As shown in FIG. 5, a trading device may receive, at 510, an indication of a first user action on a graphical user interface (GUI). The trading device may receive an indication of the first user action on a first portion of the GUI. The first user action may result in the submission of a trade order to the electronic exchange at 515. The trade order may be sent to the action manager for submission to the electronic exchange or an indication of the submitted order may be provided to the action manager.

The trading device may receive, at 520, an indication of a second user action on the GUI. The trading device may receive the indication of the second user action on the first portion and/or on a second portion of the GUI. The action manager may define, at 525, an order state in response to the second user action. The order state may be established in response to the second user action. For example, the order state may be defined as being in the active state in response to the second user action.

The trading device may receive, at 530, an indication of a third user action on the GUI. The indication of the third user action may be received on the first portion and/or on the second portion of the GUI. The action manager may, at 535, define a second order state in response to the third user action. For example, the order state may be defined as being in the inactive state in response to the third user action. The trading device may continue to receive an indication of the second user action for maintaining the active order state for the trade order.

The action manager may generate an order update at 540 in response to the change in the order state of the trade order. The order update may be sent to the electronic exchange at 545 to cancel or hold the working order. The action manager, at 545, may update the graphical user interface, at 550, based on the change in the order state. For example, the action manager may send the order update or an indication of the order update to cause the graphical user interface to be updated to reflect the holding or canceling of the working order.

Figure 6:
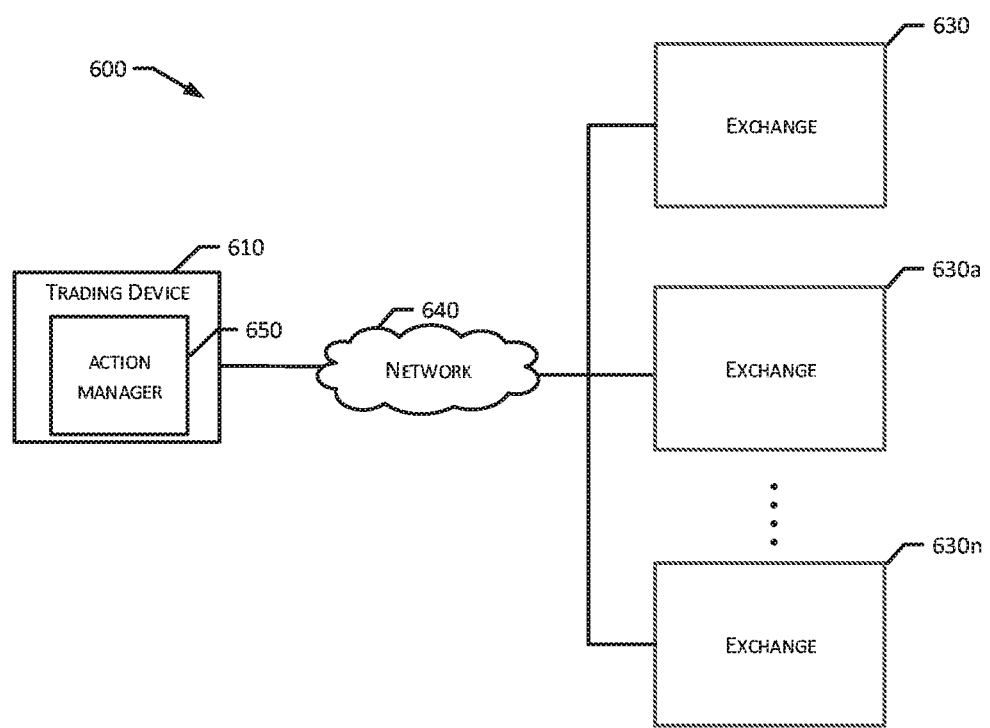
FIG. 6 illustrates a block diagram representative of an example system in which certain embodiments may be employed.

FIG. 6 illustrates a block diagram of an example system 600 that may be used to manage order states for one or more tradeable objects at one or more electronic exchanges based on user actions. The system 600 may include a trading device 610 that may receive market data from one or more exchanges, such as exchange 630 and/or exchanges 630a to 630n. The trading device 610 may communicate with the exchanges through a network 640. Though not shown in FIG. 6, the trading device 610 may communicate with the exchanges via a gateway. The market data from the exchanges 630 to 630n may correspond to one or more tradeable objects at each market.

The market data may include values and quantities (e.g., bid quantities and offer quantities) related to one or more tradeable objects. The market data for a futures contract may include the inside market, market depth, a last traded price, and/or price levels associated with the inside market and market depth.

The market data may be received at the trading device 610 in response to a query from the trading device 610 or in an update message received periodically from the exchanges 630 to 630n. The market data may be received from the exchanges 630 to 630n in response to an update of the market data for one or more tradeable objects at the exchanges 630 to 630*n*. The trading device 610 may store the market data locally, at a remote device, or the market data may be distributed across multiple devices. For example, the trading device 610 may include a trading terminal and a trading server at which the market data may be stored.

The trading device 610 may be capable of generating and/or displaying a user interface that may indicate relevant information related to one or more tradeable objects as described herein. As described above, the trading device 610 may be a trading server and/or a trading terminal. The functionality described herein may be performed on the trading terminal, the trading server, or may be distributed across the trading terminal and the trading server. For example, the trading device 610 may include a trading terminal capable of displaying a user interface for an application executing locally on the trading terminal or an application executing remotely on the trading server and accessed on an application at the trading terminal (e.g., via a web browser or other application).

The trading device 610 may include an action manager 650, which may be executed locally at the trading terminal, at the trading server, or may be distributed across the trading terminal and the trading server. The action manager 650 may include a hardware and/or software module that may be executed at the trading device 610. The action manager 650 may be executed, from memory, by a processor located at a trading device 610. The action manager 650 may define and/or maintain an order state for tradeable objects at a market. For example, the action manager 650 may receive trade orders, receive user actions, and/or define or maintain the order state of the trade orders based on the user actions. The trading device 610 may generate a user interface that provides relevant information related to available a tradeable object on a market, or provide indications to another computing device so generate such a user interface. The action manager 650 may perform one or more of the embodiments described herein, or portions thereof, to generate and/or display a user interface that provides the relevant trade status and/or other information for one or more tradeable objects.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method including:

displaying, by a graphical user interface of a computing device, a value column and a second column, wherein the value column includes a plurality of cells, wherein each cell in the plurality of cells of the value column corresponds to a price level of a plurality of price levels for a tradeable object, wherein the second column includes a plurality of cells, wherein each cell in the plurality of cells of the second column is aligned in a row with a corresponding cell in the value column and associated with the corresponding price level;

detecting, by the graphical user interface of the computing device, a downclick action of a user input device in a first cell of the plurality of cells of the second column indicating a user selection of the first cell, wherein the downclick action is detected at a first time;

sending, by an action manager of the computing device, in response to detecting the downclick action, a first trade order message to an electronic exchange, wherein the first trade order message is for a first order for the tradeable object at a price corresponding to the price level associated with the first cell;

detecting, by the graphical user interface of the computing device, that the downclick action of the user input device in the first cell is being maintained indicating a state of the first order is to be maintained as active wherein the downclick action being maintained is detected at a second time, wherein the second time is after the first time;

detecting, by the graphical user interface of the computing device, after detecting that the downclick action of the user input device has been maintained, an upclick action of the user input device that releases the downclick action in the first cell indicating the state of the first order is to be changed wherein the upclick action is detected at a third time, wherein the third time is after the second time; and sending, by the action manager of the computing device, in response to detecting the upclick action, a first order update message to the electronic exchange, wherein the first order update message cancels the first order.

2. The method of claim 1, further including:
providing, by the computing device, feedback to the user while the downclick action is being maintained.

3. The method of claim 2, wherein the feedback is haptic feedback.

4. The method of claim 2, wherein the feedback is a graphical indicator.

5. The method of claim 1, wherein the downclick action also indicates a selection of a second cell of the plurality of cells of the second column.

6. The method of claim 5, further including:
sending, by the action manager of the computing device, in response to detecting the downclick action, a second trade order message to the electronic exchange, wherein the second trade order message is for a second order for the tradeable object at a price corresponding to the price level associated with the second cell; and
sending, by the action manager of the computing device, in response to detecting the upclick action, a second order update message to the electronic exchange, wherein the second order update message cancels the second order.

7. The method of claim 1, further including:
displaying, by the graphical user interface of the computing device, an indicator, wherein the indicator represents a time remaining, after detecting the upclick action, before the first order update message is sent.

* * * * *